United States Patent
Higaki et al.

(10) Patent No.: US 9,329,376 B2
(45) Date of Patent: May 3, 2016

(54) IMAGING APPARATUS

(75) Inventors: Yoshinari Higaki, Utsunomiya (JP); Miyoko Kawashima, Haga-gun (JP); Toshihiko Tsuji, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 570 days.

(21) Appl. No.: 13/488,601

(22) Filed: Jun. 5, 2012

(65) Prior Publication Data

US 2012/0327208 A1 Dec. 27, 2012

(30) Foreign Application Priority Data

Jun. 22, 2011 (JP) ................................ 2011-138704
May 10, 2012 (JP) ................................ 2012-108654

(51) Int. Cl.
*G02B 21/36* (2006.01)
*H04N 5/357* (2011.01)
*G02B 27/00* (2006.01)
*G02B 13/18* (2006.01)

(52) U.S. Cl.
CPC .......... *G02B 21/365* (2013.01); *G02B 27/0068* (2013.01); *H04N 5/3572* (2013.01); *G02B 13/18* (2013.01)

(58) Field of Classification Search
CPC .. G02B 21/365; G02B 27/0068; G02B 1/183; H04N 5/3572
See application file for complete search history.

(56) References Cited

U.S. PATENT DOCUMENTS

| 7,825,360 | B2 | 11/2010 | Karasawa et al. | 250/201.2 |
| 2008/0068609 | A1* | 3/2008 | Werkman | G03F 7/70633 356/399 |
| 2008/0240709 | A1* | 10/2008 | Nakamura | H04N 5/225 396/529 |
| 2009/0128643 | A1 | 5/2009 | Kondo et al. | 348/218.1 |
| 2009/0137990 | A1* | 5/2009 | Sheinis | A61F 9/008 606/5 |
| 2009/0210809 | A1* | 8/2009 | Bacus | G01N 1/312 715/764 |
| 2011/0013196 | A1* | 1/2011 | Aoki | G01J 9/02 356/498 |
| 2011/0102572 | A1* | 5/2011 | Kihara | G02B 21/244 348/79 |

FOREIGN PATENT DOCUMENTS

| JP | 5-196873 | 8/1993 |
| JP | 6-011341 | 1/1994 |
| JP | 2005-98833 | 4/2005 |
| JP | 4333785 | * 9/2005 |
| JP | 2006-32692 | 2/2006 |
| JP | 2008-276070 | 11/2008 |
| JP | 4333785 | 9/2009 |
| JP | 2011-095685 | 5/2011 |

* cited by examiner

*Primary Examiner* — Thai Tran
*Assistant Examiner* — Christopher T Braniff
(74) *Attorney, Agent, or Firm* — Fitzpatrick, Cella, Harper & Scinto

(57) ABSTRACT

An imaging apparatus comprises: an imaging unit having an imaging optical system and an imaging device; a measuring unit that measures, for each of a plurality of regions on a specimen, an optical aberration or a physical quantity causing the aberration before the imaging of the specimen is performed; a plurality of optical elements that are inserted in an optical path of the imaging optical system for correcting the aberration and that differ in correction amount; and a control unit that selects an optical element from among the optical elements on the basis of a measurement result of the measuring unit, and inserts the selected optical element into the optical path of the imaging optical system before the imaging of the specimen. The imaging optical system is configured to be capable of forming simultaneously images of the plurality of regions on the imaging device.

14 Claims, 9 Drawing Sheets

IMAGING APPARATUS

BACKGROUND OF THE INVENTION

1. Field of the Invention

The present invention relates to an imaging apparatus that performs imaging of a specimen and acquires a digital image.

2. Description of the Related Art

An imaging apparatus that performs imaging of a microscope image such as a tissue slice of a human body and enables the accumulation and observation of digital image data has recently attracted much attention in the field of pathological diagnostic. In the imaging apparatus of this kind, a configuration (slide) in which a specimen, which is an observation object, is covered and fixed by a transparent protective member (cover glass) is typically used as a subject. When imaging of such a subject is performed, since the protective member is present between the specimen and an imaging optical system, the observed image is known to be degraded (decrease in contrast, blurring) due to optical aberration caused by the protective member. Further, the aberration is apparently caused not only by the protective member located on the slide. Thus, the aberration in the imaging optical system changes depending on ambient conditions such as temperature.

As a means for inhibiting the effect of aberration caused by the protective member, Japanese Patent Application laid-open No. 2011-095685 discloses a configuration in which a lens for spherical aberration correction is moved on the basis of focus information and structural information on a specimen acquired by pre-scanning, and a group of partial images acquired after the spherical aberration has been corrected are synthesized by image processing. Further, Japanese Patent Application laid-open No. 2008-276070 discloses a configuration in which an aberration correction amount is determined from the detected optical thickness of the specimen protective member and an image with corrected aberration is acquired by moving a correction ring mechanism.

Further, Japanese Patent Application laid-open No. H5-196873 discloses an objective lens having a structure that enables the user to attach an aberration correction lens as necessary.

Typically, there is an unpredictable spread in the thickness of the protective member of a specimen. Further, the aberration in the imaging optical system can change depending on ambient conditions such as temperature. Therefore, it is possible that optical aberration degrading the image quality changes among the slides or depending on the in-plane position in the same slide. Meanwhile, in hospitals, a large number of specimens should be observed by the aforementioned imaging apparatus to perform pathological diagnostic, and it is an important task to shorten the time needed to acquire image data on the specimen. However, the apparatuses described in the aforementioned Japanese Patent Application laid-open Nos. 2011-095685, 2008-276070, and H5-196873 are ineffective in acquiring images with corrected aberration with respect to each position when the correction amount differs depending on the position in the imaging region. This is because the correction of aberration is performed independently for each image of a subregion within the imaging region and it is necessary to synthesize thereafter the group of acquired images. When the correction amount differs depending on the position, the processing time is unavoidably increased. Accordingly, it is worthy of consideration to increase the speed by performing simultaneous imaging of a plurality of subregions, while correcting the aberration that differs depending on the position. Meanwhile, where the imaging is performed in one cycle, without dividing the imaging region into subregions, the accuracy of aberration correction (that is, image quality) will unavoidably spread depending on the position.

SUMMARY OF THE INVENTION

The present invention has been created to resolve the abovementioned problems inherent to prior art, and it is an object of the present invention to provide a technique making it possible to acquire rapidly high-quality images with adequately corrected optical aberration, even when there is a spread in aberration factors such as the thickness of the protective member.

The present invention in its first aspect provides an imaging apparatus that performs imaging of a specimen to acquire a digital image thereof, the imaging apparatus including: an imaging unit having an imaging optical system and an imaging device; a measuring unit that measures, for each of a plurality of regions on the specimen, an optical aberration or a physical quantity causing the aberration before the imaging of the specimen is performed by the imaging unit; a plurality of optical elements that are inserted in an optical path of the imaging optical system for correcting the aberration and that differ in correction amount; and a control unit that selects an optical element from among the plurality of optical elements on the basis of a measurement result of the measuring unit, and inserts the selected optical element into the optical path of the imaging optical system before the imaging of the specimen is performed by the imaging device, wherein the imaging optical system is configured to be capable of forming simultaneously images of the plurality of regions on the imaging device.

In accordance with the present invention, it is possible to acquire rapidly high-quality images for which optical aberration at each position has been adequately corrected, even when there is a spread in aberration factors such as the thickness of the protective member.

Further features of the present invention will become apparent from the following description of exemplary embodiments with reference to the attached drawings.

DESCRIPTION OF THE EMBODIMENTS

The present invention relates to an imaging apparatus that performs imaging of a specimen (sample) to acquire a digital image thereof, and more particularly to a configuration in which the correction of aberration caused by the protective member that covers a specimen is performed automatically and with good accuracy. More specifically, the specific feature of the imaging apparatus in accordance with the present invention is that the thickness of the protective member is actually measured by a measuring unit before the imaging of the specimen is performed, and an optical element that is inserted in (mounted on) the optical path of the imaging optical system is automatically switched.

The present invention can be specifically implemented as an imaging apparatus and also can be specifically implemented as an imaging system in which the imaging apparatus is combined with a computer (or a display device). Such an imaging apparatus or imaging system can be advantageously used in a virtual slide creation system or a digital microscope and is very useful for application, for example, to pathological diagnostic.

Embodiments of the present invention will be described below with reference to the appended drawings.

System Configuration

Figure 1:
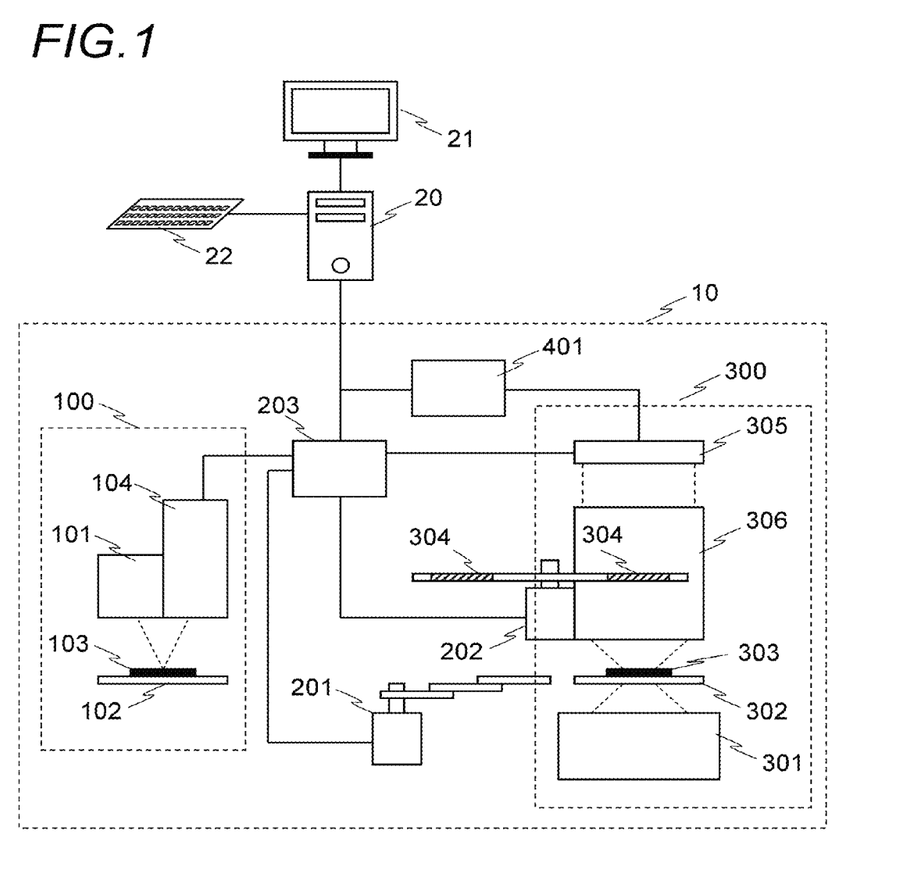
FIG. 1 illustrates the configuration of an imaging system.

FIG. 1 shows a schematic configuration of the imaging system according to an embodiment of the present invention. As shown in FIG. 1, the imaging system of the present embodiment is constituted by an imaging apparatus 10 and a computer (PC) 20, and a display device 21 and an input device 22 are connected to the PC 20. The system configuration shown in FIG. 1 is merely an example. Thus, the imaging apparatus 10 and the PC 20 may be configured integrally, and the display device 21 or the input device 22 may be configured integrally with the imaging apparatus 10 or the PC 20.

As shown in FIG. 1, the imaging apparatus 10 is provided with a measuring unit 100, an imaging unit 300, a transport unit 201, a drive unit 202, a control unit 203, and an image processing unit 401.

The measuring unit 100 is a measuring means for measuring the thickness of a protective member of a slide 103 and is constituted by a measuring illumination unit 101, measuring stage 102, and measuring device 104. The measuring illumination unit 101 has an illumination optical system that guides light from a light source to the slide 103 disposed on the measuring stage 102. The measuring stage 102 is a holding means for holding the slide 103 and adjusting the position of the slide 103 with respect to the measuring device 104. The measurement object of the measuring unit 100 is not necessarily only the thickness of the protective member. For example, the measurement object may also be the aberration of an imaging unit 300 or a temperature that causes changes thereof. It is generally well known that aberration of optical devices changes depending on the ambient temperature. For example, Japanese Patent Application laid-open No. 2006-221150 discloses an optical microscope apparatus having a means for correcting thermal drift, that is, the displacement of focal position caused by changes in temperature.

In the slide 103 used in the present embodiment, a specimen (tissue slice of a living body or the like) serving as an observation object is placed on a slide glass and fixed by covering with a transparent protective member (cover glass or the like). The thickness of the protective member typically has a spread of from several micrometers to ten-odd micrometers.

The measuring device 104 measures the distance to the upper surface and lower surface of the protective member by receiving the light that has been emitted by the measuring illumination unit 101 and reflected by the upper and lower surface of the protective member, and determines the thickness of the protective member from the difference in distance to the upper surface and lower surface. The measurement data of the measuring device 104 are transmitted to the control unit 203. The measuring device 104 of any specific configuration may be used, provided that the spread in the thickness of the protective member can be measured with the necessary accuracy. Suitable examples include an optical distance measurement method using a triangulation method, such as disclosed in Japanese Patent Application laid-open No. H6-011341, or a method for measuring the distance traveled by a laser beam reflected by a glass interface by using a confocal optical system, such as disclosed in Japanese Patent Application laid-open No. 2005-98833.

The transport unit 201 is a transport means for transporting the slide 103 located on the measuring stage 102 onto an imaging stage 302. For example, a mechanism in which the measuring stage 102 moves by itself and functions as the imaging stage 302 or a mechanism in which a slide is clamped or suction held by a hand and moved onto the stage can be used as a specific mechanism of the transport unit 201. When imaging of a plurality of slides is performed continuously, slides accommodated in a stocker (not shown in the figure) are successively transported one by one by the transport unit 201 to the measuring stage 102 and imaging stage 302.

The control unit 203 is a circuit that controls various blocks constituting the imaging apparatus 10, such as the measuring unit 100, transport unit 201, drive unit 202, imaging unit 300, and image processing unit 401. The control unit 203 also has a function of controlling the drive unit 202 or the imaging unit 300 so as to perform the aberration correction corresponding to the thickness of the protective member on the basis of the measurement data obtained from the measuring unit 100. The specific functions and operation of the control unit 203 will be described below in greater detail. In FIG. 1, the control unit 203 and the image processing unit 401 are shown as separate blocks, but they may be constituted by separate processing circuits or by a single processing circuit. A configuration in which the PC 20 performs the functions of the control unit 203 or the image processing unit 401 may be used, or a configuration in which, conversely, the control unit 203 or the image processing unit 401 performs the functions of the PC 20 may be used.

The drive unit 202 is a mechanism that takes out one optical element from among a plurality of optical elements 304, which have been prepared in advance, on the basis of a signal transmitted from the control unit 203 and inserts the selected optical element into a predetermined position of an imaging optical system 306 of the imaging unit 300. In the present embodiment, the drive unit 202 is constituted by a turret in which the plurality of optical elements 304 that differ in aberration correction amount is arranged on the circumference. By using the rotating turret, it is possible to exchange the optical elements 304 rapidly, and when a large number of specimens are observed, the observation time can be greatly reduced. However, this configuration of the drive unit 202 is not limiting and, for example, the optical elements 304 may be also replaced by a mechanism such as a hand device.

In FIG. 1 the imaging unit 300 is constituted by an imaging illumination unit 301, the imaging stage 302, an imaging device 305, and the imaging optical system 306. If necessary, the optical element 304 for aberration correction can be inserted into the imaging optical system 306.

The imaging illumination unit 301 has an illumination optical system that guides light from a light source to the slide 303 disposed on the imaging stage 302. For example, a halogen lamp, a xenon lamp, or a LED (Light Emitting Diode) can be used for the light source.

The imaging stage 302 is a holding means for holding the slide 303 and adjusting the position of the slide 303 relative to the imaging device 305 or the imaging optical system 306. As has been mentioned above, the slide is moved from the measuring stage 102 to the imaging stage 302 by the transport unit 201. A configuration may be also used in which different slides are disposed simultaneously at a certain timing on the measuring stage 102 and the imaging stage 302 and the operation of measuring the thickness of the holding member and the imaging operation are performed in parallel.

The optical element 304 is a correction optical element that is inserted in (mounted on) the optical path of the imaging optical system 306 to correct the optical aberration caused by the transparent protective member of the slide 303. The optical element 304 may be a pupil filter that is inserted into a position close to a pupil plane or a conjugated position thereof. Further, the optical element 304 may have a shape with rotational symmetry of transmittance and phase. The rotational symmetry facilitates the production of the optical element and improves the accuracy of transmittance and phase modulation amount.

A phase variation $\phi$ imparted by the optical element 304 to the transmitted light is represented by the Eq. (1) in which C is a constant determined from the wavelength of illumination light and the refractive index and thickness of the protective member; NA is a numerical aperture of the imaging optical system 306 on the specimen side; and r represents a radial component in polar coordinates on the optical element 304 and is a value obtained by dividing a distance between a point through which an optical axis passes and an evaluation point by a radius of the pupil.

$$\phi(r)=C\cdot(1-\sqrt{1-(NA\cdot r)^2})^2 \quad (1)$$

The phase variation $\phi$ can be also represented by Eq. (2). Eq. (2) is an approximation of Eq. (1). C1 and C2 are constants determined from the wavelength of illumination light and the refractive index and thickness of the protective member, and r represents a radial component in polar coordinates on the optical element 304 and is a value obtained by dividing a distance between a point through which an optical axis passes and an evaluation point by a radius of the pupil.

$$\phi(r)=C_1 r^2+C_2 r^4 \quad (2)$$

The imaging device 305 performs photoelectric conversion of the light received via the imaging optical system 306, and generates and outputs image data. The image data are transmitted to the image processing unit 401. The imaging device 305 converts the received optical image into electric signals with an image sensor, for example, a CCD (Charge Coupled Device) or CMOS (Complementary Metal Oxide Semiconductor).

The image processing unit 401 performs image processing, for example, gamma correction, noise removal, and compression, with respect to the image data. When one slide 303 is divided into a plurality of blocks for imaging, the processing of synthesizing (merging or linking) the images of the blocks is performed. The image processing unit 401 may be located inside the PC 20, or inside the imaging apparatus 10, or may be a special device independent of the PC 20 and the imaging apparatus 10.

The PC 20 accumulates image data transmitted from the image processing unit 401. The image data may be accumulated in a storage device located inside the PC 20 or in an external storage (not shown in the figure). In the present embodiment, the control unit 203 performs switching control of the optical elements 304 on the basis of the measurement data, but such control can be also performed by PC 20. In this case, the measurement data from the measuring device 104 are transmitted to the PC 20 and accumulated therein, and the PC 20 determines the adequate optical element 304 on the basis of the measurement data and transmits an instruction signal for switching the optical elements 304 to the control unit 203. Further, the PC 20 can also transmit an instruction signal relating to the selection of the optical element 304 to the control unit 203 on the basis of a signal from the input device 22.

First Embodiment

The first embodiment of the image acquisition method performed in the imaging system shown in FIG. 1 will be explained below. In the explanation below, partial regions obtained by dividing an imaging region will be called subregion; the subregions may overlap each other or be in an exclusive relationship. The information relating to the subregions, such as the positions and dimensions thereof, may be designated by the user prior to imaging. The control unit 203 may store such information as a database in advance. In the configuration of the first embodiment, aberration correction is performed by the optical elements 304 of one kind with respect to one slide. Thus, the method of the present embodiment is applied to the case where the optical elements 304 corresponding to the measurement data of a plurality of subregions on the slide measured by the measuring unit 100 are of one kind only.

Figure 2:
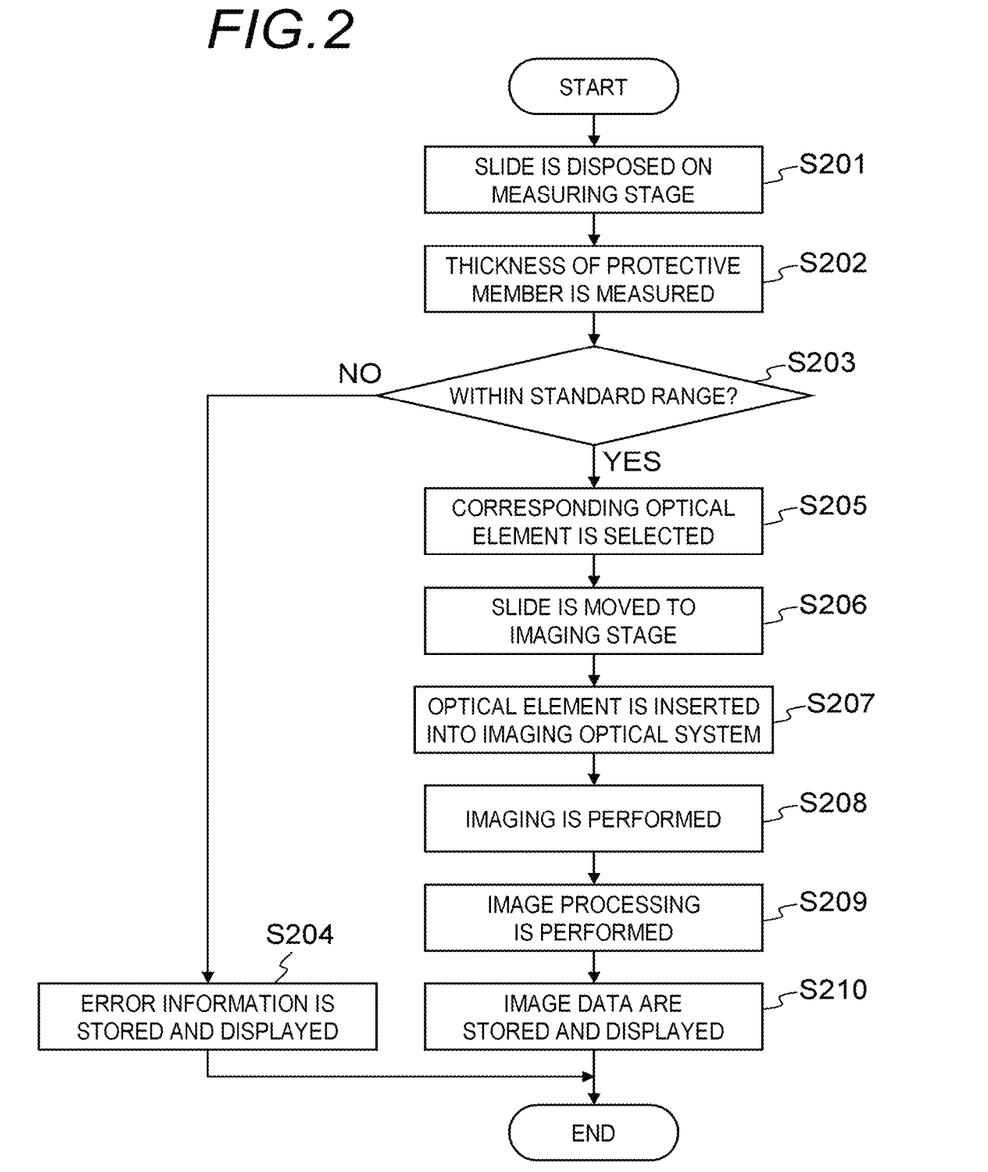
FIG. 2 is a flowchart illustrating the processing sequence of the first embodiment.

FIG. 2 is a flowchart illustrating the processing sequence of the first embodiment. The operation of the imaging system will be explained according to this flowchart.

First, the control unit 203 controls the transport unit 201 and disposes the slide 103 on the measuring stage 102 (S201). The arrangement on the measuring stage 102 may be also performed by the user rather than automatically.

Then, the slide 103 disposed on the measuring stage 102 is illuminated by the measuring illumination unit 101. The measuring device 104 measures the thickness of the protective member by receiving the light reflected from the predetermined measurement position of the slide 103 and transmits the measurement data to the control unit 203 (S202). The information relating to the measurement position is inputted by the user from the input device 22 or set in advance in the PC 20, control unit 203, or measuring device 104.

In response to the instruction from the control unit 203, the measuring unit 100 performs the measurement at a plurality of positions on the slide 103 by a method of performing a plurality of measurements, for example, by moving the measuring stage 102. When a plurality of measurement positions are included in each subregion, a computation unit (not shown in the figure) located inside the control unit 203 calculates a representative value from the measurement data obtained at the plurality of measurement positions and outputs the representative value as the thickness of the protective member in each subregion. Examples of suitable representative values include an average value, a median, and a maximum value.

The control unit 203 compares the measured value (thickness of the protective member) obtained in S202 for each subregion with a predetermined standard range (S203). Where a subregion is present in which the measured value is outside the standard range, the control unit 203 transmits an instruction to the transport unit 201, the slide 103 is carried out from the measuring stage 102, and error information is transmitted to the PC 20 in order to cancel the imaging of the slide 103. The PC 20 stores the error information together with the slide identification information and outputs the error information to the display device 21 (S204).

Meanwhile where the measured values of all of the subregions are within the standard range, the control unit 203 selects the optical element 304 with an adequate aberration correction amount from among the plurality of optical elements 304 on the basis of the measured values (thickness of the protective member) (S205). The correspondence between the thickness of the protective member and the optical element is determined on the basis of a determination criterion that has been indicated by the PC 20 or stored in advance.

Figure 3:
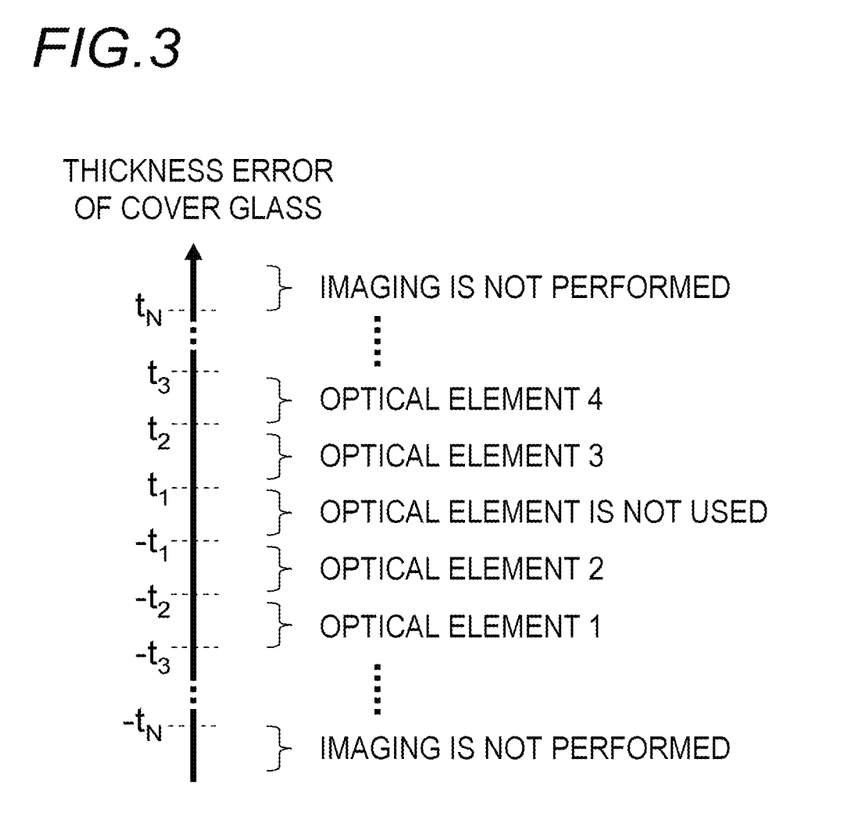
FIG. 3 shows an example of correspondence relationship of measurement data and optical element.

FIG. 3 shows an example of the determination criterion. In this example of the determination criterion, an error $t_N$ (=measured value−reference thickness of the protective member) of the thickness of the protective member and the number of the optical element are associated with each other. In FIG. 3, N is an arbitrary natural number. Where the error of the thickness of the protective member is less than $-t_N$ or equal to or greater than $t_N$, the imaging of the slide is not performed. Where the error is equal to or greater than $-t_3$ and less than $-t_2$, the optical element 1 is used; where the error is from $-t_2$ to $-t_1$, the optical element 2 is used; where the error is from $t_1$ to $t_2$, the optical element 3 is used; and where the error is from $t_2$ to $t_3$, the optical element 4 is used. Where the error is from $-t_1$ to $t_1$, no optical element is inserted. When the same optical element 304 is selected for all of the subregions, the following processing is executed. When the optical elements selected for subregions differ from each other, the processing explained in the second embodiment is performed.

Then, the control unit 203 controls the transport unit 201 to transport the slide 103 from the measuring stage 102 to the imaging stage 302 (S206). The control unit 203 also controls the drive unit 202 to rotate the turret and insert the optical element 304 selected in S205 into the imaging optical system 306 (S207). In this case, it is preferred that the processing of S206 be executed in parallel with that of S207.

Then, the slide 303 disposed on the imaging stage 302 is illuminated by the imaging illumination unit 301, and an optical image of the specimen enlarged by the imaging optical system 306 is formed by the imaging device 305 (S208). The imaging device 305 transmits the image data to the image processing unit 401. After the image processing unit 401 has performed necessary image processing with respect to the image data, the image data are transmitted to the PC 20 (S209). The PC 20 stores the image data in the storage device and displays the image data on the display device 21 in response to the instruction from the user (S210).

With the configuration of the above-described present embodiment, since an optical element is used that has an adequate aberration correction amount corresponding to the measured value of the thickness of the protective member, optical aberration caused by the protective member can be adequately corrected even when a spread in the protective member thickness is present among the slides. As a result, high-quality image with little blurring and good contrast can be acquired.

Furthermore, since a mechanism may be used that replaces in a simple manner the optical element 304 inserted into the imaging optical system 306, without the necessity to drive the imaging optical system 306 itself, the increase of the apparatus in size can be avoided even when a highly accurate correction is required and the apparatus cost can be reduced. Further, since all of the processing operations, such as thickness measurement of the protective member and selection and insertion of the adequate optical element are performed automatically and no decision is required from the user, the imaging of a large number of slides can be performed by batch processing. Further, since the necessary pre-processing includes only the operation of measuring the protective member thickness in a plurality of points, the decrease in throughput is avoided.

SPECIFIC EXAMPLE

A specific example of the above-described first embodiment is explained below.

Figure 5:
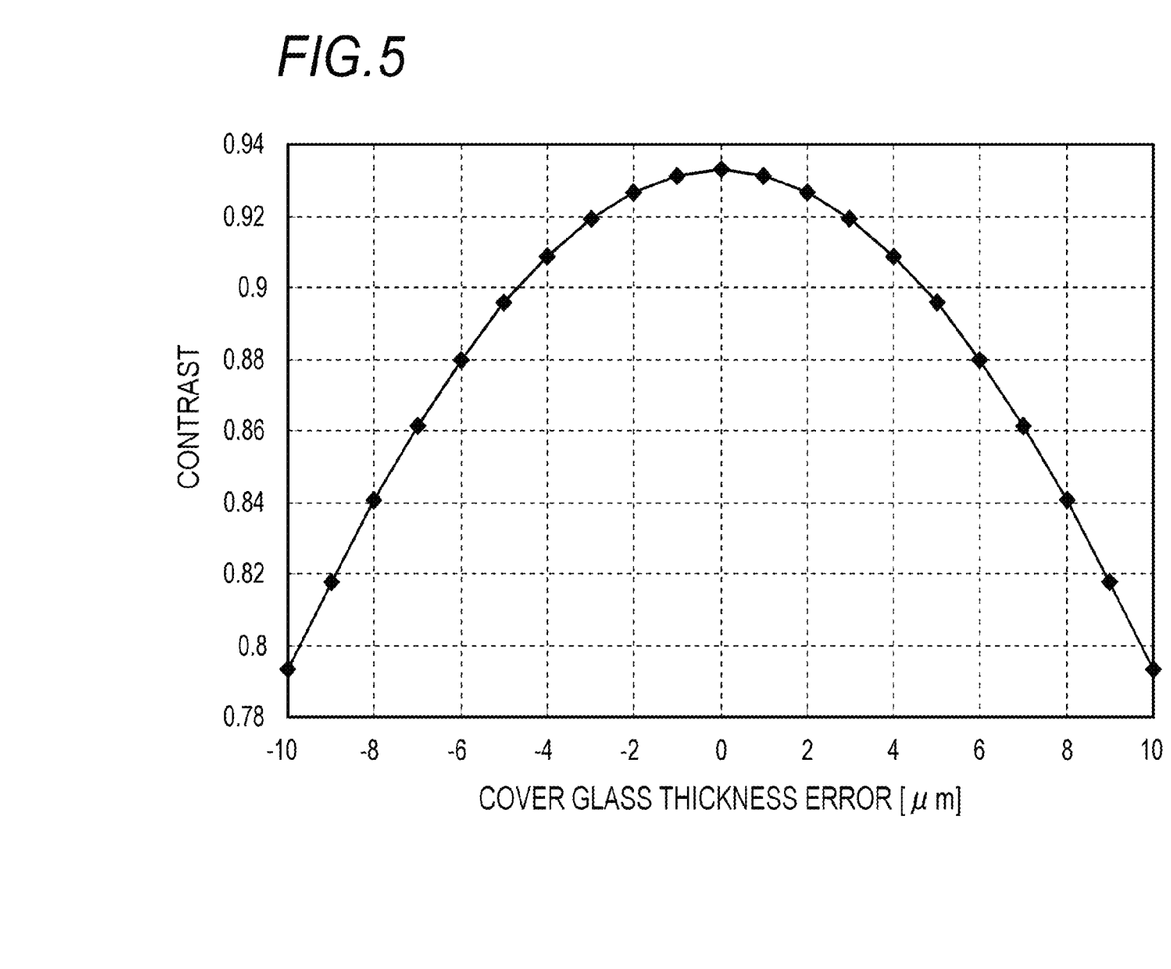
FIG. 5 illustrates an example of calculated values of contrast in relation to the thickness error of a cover glass.

FIG. 5 shows simulation results relating to the contrast of a bar chart obtained with a wavelength of the illumination light of the imaging illumination unit 301 of 550 nm, a numerical aperture of the imaging optical system 306 on the specimen side of 0.7, and a refractive index of the cover glass of 1.5. The bar chart used herein has a width of 0.5 μm, a pitch of 1.0 μm, a transmittance on the inner side of the bar of 0, and a transmittance on the outer side of the bar of 1. Spherical aberration caused by the cover glass is represented in radian units by Eq. (1).

The imaging optical system 306 is assumed to be designed such that the aberration is eliminated when the thickness error of the cover glass is 0 μm, that is, when the supposed thickness is obtained. Further, C in Eq. (1) can be represented by Eq. (3). In Eq. (3), the thickness error of the cover glass is denoted by t, the refractive index is denoted by n, and the illumination light wavelength is denoted by λ. The definition of contrast is represented by Eq. (4). Imax and Imin represent a maximum value and a minimum value of image intensity of portions of bar charts.

$$C = \frac{\pi}{n^3}(n^2 - 1)\frac{t}{\lambda} \quad (3)$$

$$\text{Contrast} = \frac{I_{max} - I_{min}}{I_{max} + I_{min}} \quad (4)$$

In the present example, the optical element 304 that corrects spherical aberration is realized by a phase plate (pupil filter) having a surface profile represented by the equation obtained by substituting −1 into Eq. (1). According to FIG. 5, the cover glass thickness error at which the contrast becomes 0.80, 0.85, and 0.90 is 9.7 μm, 7.6 μm, and 4.7 μm, respectively. For example, by setting N=3, $t_3$=9.7 μm, $t_2$=7.6 μm, and $t_1$=4.7 μm in FIG. 3, it is possible to create determination criteria for selecting the pupil filters 1 to 4.

Figure 4:
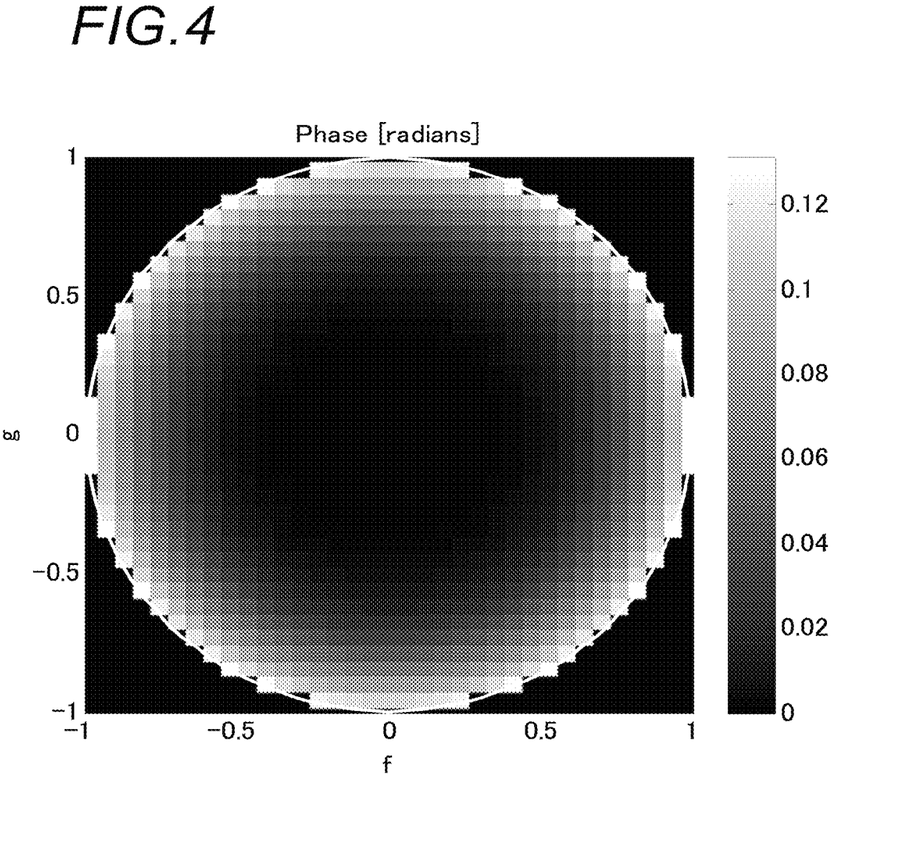
FIG. 4 shows an example of phase distribution provided by a pupil filter.

The surface profiles of the pupil filters 1 to 4 are determined from the central value of each section obtained by dividing at $t_1$ to $t_3$. In other words, a phase plate having a phase distribution $-\phi(r)$ obtained by substituting t=−8.7 μm (=$(-t_3-t_2)/2$), λ=550 nm, and n=1.5 in Eq. (3) to determine the coefficient C, and substituting this coefficient C and NA=0.7 in Eq. (1) and inverting the sign becomes the pupil filter 1. FIG. 4 shows in radian units the phase distribution that should be provided by the pupil filter 1. Likewise, the phase plate obtained in the case where t=−6.2 μm is taken as the pupil filter 2, the phase plate obtained in the case where t=+6.2 μm is taken as the pupil filter 3, and the phase plate obtained in the case where t=+8.7 μm is taken as the pupil filter 4. These pupil filters 1 to 4 are disposed on the turret.

Where the absolute value of the cover glass thickness error is equal to or greater than 9.7 μm, the imaging is not performed. Where the thickness error is −9.7 μm to −7.6 μm, the pupil filter 1 is used, where the thickness error is −7.6 μm to −4.7 μm, the pupil filter 2 is used, where the thickness error is 4.7 μm to 7.6 μm, the pupil filter 3 is used, and where the thickness error is 7.6 μm to 9.7 μm, the pupil filter 4 is used. Where the thickness error is −4.7 μm to +4.7 μm, the imaging is performed without using a pupil filter. As a result, the imaging can be performed in a state in which spherical aberrations caused by the cover glass thickness errors have been balanced out. For example, when the measured value is +8.7

μm, the pupil filter 4 is inserted into a position close to a pupil plane of the imaging optical system or a conjugated position thereof. As a result, the contrast of the bar chart is increased from 0.83, which corresponds to the case where the pupil filter is not disposed, to 0.93 obtained after the spherical aberration has been removed.

Second Embodiment

The second embodiment of the image acquisition method in the imaging system shown in FIG. 1 is explained below.

In the above-described first embodiment, the optical element 304 corresponding to the measurement results obtained for a plurality of points is the same in all of the subregions. However, some protective members have an uneven thickness and the spread in thickness cannot be ignored. Where the imaging by the method of the first embodiment is performed with respect to a specimen covered by such a protective member, an undesirable image is obtained in which regions where the aberration correction has been correctly performed are mixed with regions where such correction has not been performed (over-corrected or under-corrected regions). Accordingly, the processing explained in the second embodiment is performed when the optimum optical element 304 is different for each subregion.

Figure 6:
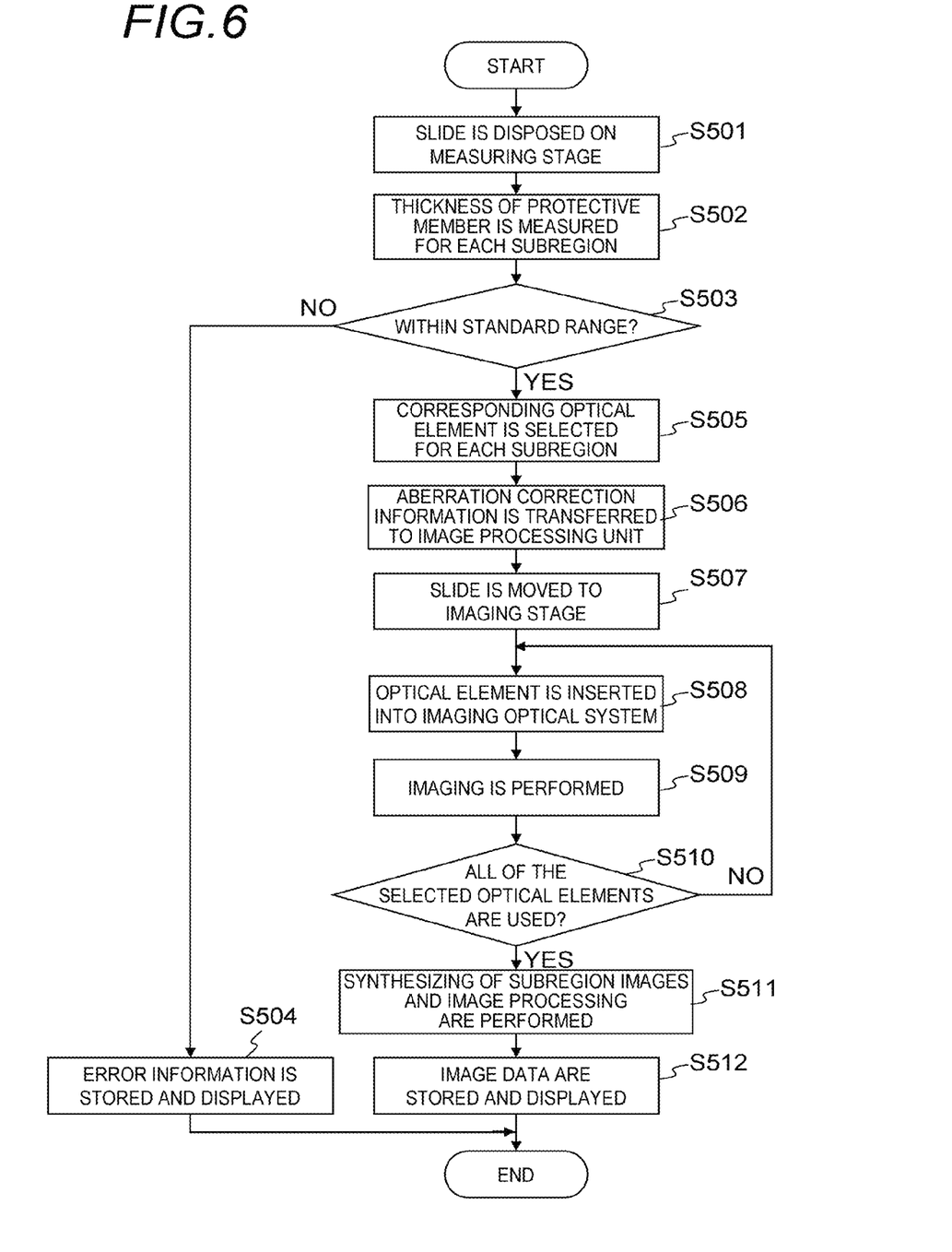
FIG. 6 is a flowchart illustrating the processing procedure of the second embodiment.

The processing procedure of the second embodiment is explained with reference to FIGS. 6 and 7. FIG. 6 is a flow chart of the image acquisition processing of the second embodiment, and FIG. 7 is a diagram illustrating the image acquisition processing (image combining processing) of the second embodiment. In the explanation below, the explanation of contents identical to that of the processing procedure of the first embodiment is omitted as appropriate.

Figure 7A:
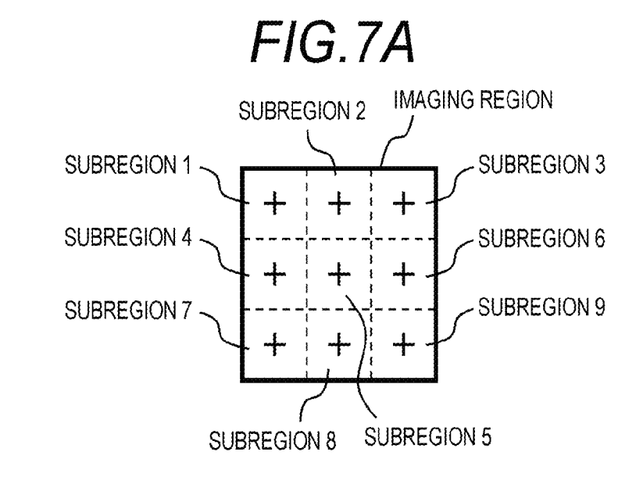
FIGS. 7A to 7D shows an example of the image synthesizing method of the second embodiment.

First, the slide 103 is disposed on the measuring stage 102 by the transport unit 201 (S501). Then, the measuring device 104 measures the thickness of the protective member of the slide 103 and transmits the measurement data to the control unit 203 (S502). In the present embodiment, as shown in FIG. 7A, the imaging region on the slide 103 is divided into nine subregions 1 to 9 and the thickness of the protective member is measured for each subregion. In the example shown in FIG. 7A, one point (position indicated by + in the figure) in the subregion is taken as the measurement position, it is also possible to perform measurements for a plurality of points in each subregion and calculate a representative value (average value, median, maximum value, or the like) in order to reduce the measurement error.

The control unit 203 compares the measured value (thickness of the protective member) for each subregion obtained in S502 with a predetermined standard range (S503) and, where any of the measured values is outside the standard range, performs a processing of canceling the imaging of this slide in the same manner as in the first embodiment (S504).

Meanwhile, where all of the measured values are within the standard range, the control unit 203 determines the adequate optical element 304 for each subregion on the basis of the measured values (thickness of the protective member) (S505). The determination criterion similar to that of the first embodiment is used to select the optical element. In the example shown in FIG. 7B, the optical element 1 is selected for the subregions 1, 3, 4, 5, and 9, and the optical element 2 is selected for the subregions 2, 6, 7, and 8. In this case, in the last processing (S509), the imaging of the entire imaging region is performed once by using the optical element 1, and the imaging of the entire imaging region is performed once by using the optical element 2. The computational unit (not shown in the figure) in the control unit 203 generates a table (referred to as aberration correction information) in which the subregion number and the number of the optical element that will be used are associated with each other and transmits the generated table to the image processing unit 401 (S506).

The control unit 203 controls the transport unit 201 to transport the slide 103 from the measuring stage 102 to the imaging stage 302 (S507) and insert the optical element to be used in the first imaging into the imaging optical system 306 (S508). When the first imaging is performed, it is preferred that the processing of S507 and S508 be executed in parallel.

The imaging of the entire imaging region of the specimen is then performed by the imaging device 305 and the image data are transmitted to the image processing unit 401 (S509). Then, the control unit 203 verifies whether or not all of the optical elements selected in S505 have been used, and when there is an optical element that has not been used for imaging (S510), the optical element inside the imaging optical system 306 is replaced (S508) and the imaging of the specimen is performed again (S509). A plurality of pieces of image data with different aberration correction amount are acquired by performing the imaging of the same specimen a plurality of times, while replacing the optical elements in the above-described manner. FIG. 7C shows schematically image data 1 obtained when imaging is performed using the optical element 1 and image data 2 obtained when imaging is performed using the optical element 2. The angle of field of the two images is the same, but the contrast of the subject image differs due to the difference in correction aberration amount.

Then, the image processing unit 401 generates synthesized image data that have been subjected to adequate aberration correction for each subregion by synthesizing a plurality of pieces of image data that differ in aberration correction amount with reference to the aberration correction information (S511). In S511, the necessary image processing such as gamma correction, noise removal, and compression is performed in the same manner as in the first embodiment.

Any specific method for synthesizing the images may be used, but from the standpoint of simplicity of processing, for example, a method by which partial images are extracted from a plurality of images of the entire imaging region, which have been acquired in S509, and stitched is preferred. This method is explained below with reference to FIGS. 7C and 7D. The image processing unit 401 divides image data 1, 2 of the entire imaging region shown schematically in FIG. 7C into partial images for each subregion. The image processing unit 401 then selects which partial image of the image data 1, 2 to use for each subregion according to the correspondence relationship indicated by the aberration correction information generated in S506. A single synthesized image is then generated by stitching (tiling) the partial images selected for each subregion. FIG. 7D shows schematically the synthesized image generated on the basis of the aberration correction information shown in FIG. 7B and the image data shown in FIG. 7C. It is clear that the partial image of the image data 1 that has been obtained by imaging using the optical element 1 is used for the subregions 1, 3, 4, 5, and 9, and the partial image of the image data 2 that has been obtained by imaging using the optical element 2 is used for the subregions 2, 6, 7 and 8.

The synthesized image data generated by the image processing unit 401 are transmitted to the PC 20. The PC 20 stores the synthesized image data in a storage device and displays the data on the display device 21 as indicated by the user (S512).

With the above-described configuration of the present embodiment, the optical aberration caused by the protective member can be adequately and automatically corrected in the same manner as in the first embodiment, and a high-quality image having little blurring and good contrast can be acquired. Further, since using only the mechanism for replacing the optical elements 304 inserted into the imaging optical system 306 is sufficient, the increase in apparatus size and cost can be inhibited.

In addition, in the present embodiment, the aberration correction amount is changed according to the thickness of the protective member for each subregion. Therefore, a high-quality image subjected to adequate aberration correction for the entire imaging region can be acquired even when the thickness of the protective member is uneven.

In the present embodiment, the imaging is performed a plurality of times with respect to a single specimen. As a result, the time required for the imaging is longer than in the first embodiment. However, as has been demonstrated in the explanation of S505, since the optical element which is to be used is selected on the basis of the measurement results relating to the protective member, the number of imaging cycles is not larger than the number of the selected optical elements. Further, the imaging may be performed using the optical elements of all kinds and only the image data necessary when the images are synthesized may be used, provided that the imaging time is not a problem.

Third Embodiment

Figure 8A:
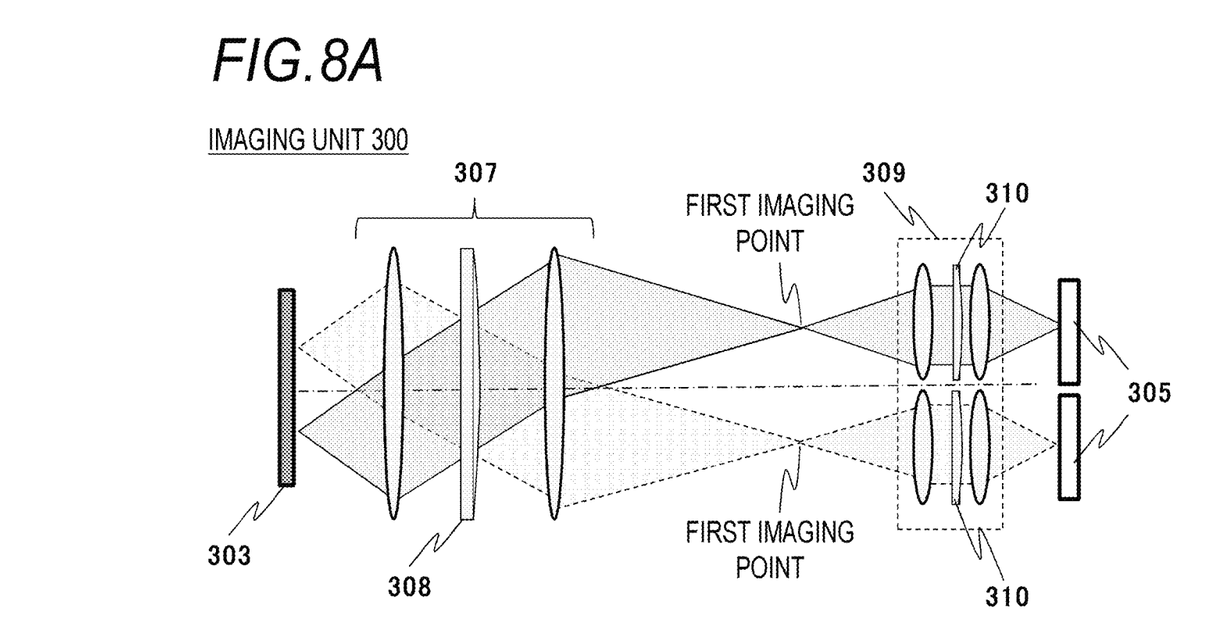
FIGS. 8A to 8C shows the configuration of the imaging system of the third embodiment.
Figure 8B:
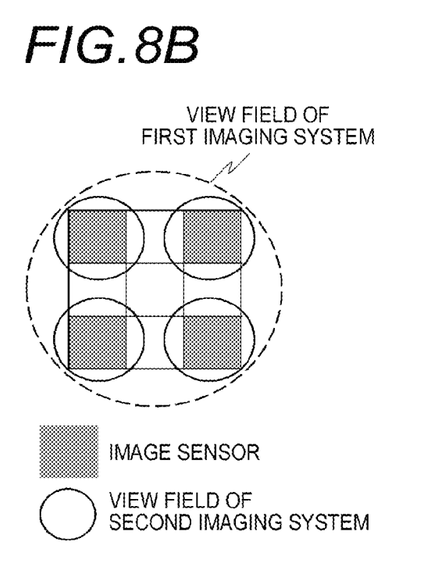

An image acquisition method using the imaging system having the imaging unit shown schematically in FIG. 8A will be explained below as the third embodiment. The imaging unit 300 shown in FIG. 8A is an alternative to the imaging unit 300 shown in FIG. 1. Further, the slide 303, first imaging point, and imaging device 305 are in an optically conjugated relationship with each other. A separate intermediate imaging point may be present in addition to the first imaging point. In the optical system shown in FIG. 8A, an enlarged image of the entire specimen is formed by a first imaging system 307 on a plane including the first imaging point, or in the vicinity of such plane, and an enlarged image of a subregion that is a portion of the enlarged image is formed by a plurality of second imaging systems 309 on a plurality of corresponding imaging devices 305. A similar apparatus configuration can be found, for example, in Japanese Patent No. 4333785. In Japanese Patent No. 4333785, an image formed by the first imaging system is formed again by a plurality of second imaging systems on an image sensor with the object of acquiring a high-resolution and high-accuracy image, but the correction of aberration is not considered. In the present embodiment, the imaging region is divided in nine subregions in the same manner as in the second embodiment. Initially, a case will be considered by way of example in which the view fields of the second imaging systems 309 are round and the imaging of the adjacent rectangular regions is not performed at the same time to avoid overlapping on these view fields. In this case, for example, as shown in FIG. 8B, the imaging can be simultaneously performed with respect to four non-adjacent subregions if the image sensors are disposed in round view field regions of the second imaging systems 309. Since FIG. 8A is a cross-sectional view, only two second imaging systems 309 appear to be shown, but actually four second imaging systems 309 and corresponding imaging devices 305 are disposed, as indicated hereinabove. Further, the arrangement and division number of the second imaging systems 309 and imaging devices 305 are not limited to those described above, and it goes without saying that the method in accordance with the present invention can be applied to any arrangement and division number.

The processing procedure of the third embodiment is explained below with reference to FIGS. 6 and 7. FIG. 6 is a flowchart illustrating the image acquisition processing of the third embodiment. The explanation of processing steps identical to those of the second embodiment is herein omitted.

In the present embodiment, the thickness of the protective member is measured by the same method as in the second embodiment. The measurement object is not necessarily limited to the thickness of the protective member, and the aberration of a plurality of second imaging systems 309 or a physical quantity of an ambient condition such as temperature may be also measured. A Shack-Hartmann sensor is typically used as a means for measuring aberration directly. Such a sensor is disclosed, for example, in Japanese Patent Application laid-open No. 2006-32692. When the aberration is measured directly, an aberration component which is correctable by the optical element 308 or 310 should be extracted. For example, when an optical element is designed such as to correct astigmatism, it is possible to calculate the fifth term of Zernike coefficients from the measured wavefront aberration and use the calculation result for subsequent processing. Meanwhile, when the ambient temperature or the temperature of the apparatus itself is measured and used instead of the aberration, the measured values are collected, for example, by disposing a temperature sensor close to the first imaging system 307, each of a plurality of second imaging systems 309, or slide 303. Variations in the physical quantity with time may be measured in a continuous manner independently of the imaging processing, and when the variations at a level that affects the imaging performance are measured, the present optical element is replaced with an optical element that can correct the aberration resulting from such variations.

Figure 7B:
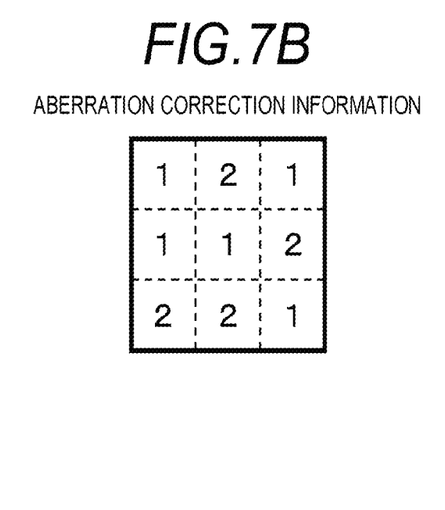
Figure 7C:
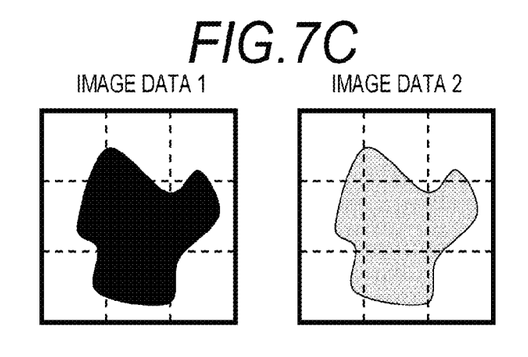
Figure 7D:
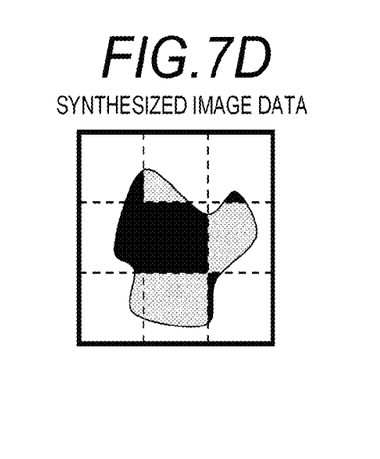

When all of the measured values outputted from the measuring unit 100 are within the standard range where the correction is possible, the control unit 203 selects the optical element 308 or 310 adequate for each subregion on the basis of the measured values (S505). The determination criterion same as that of the first embodiment can be used for selecting the optical elements. When a physical quantity of an ambient condition such as temperature is measured, the control unit 203 selects the optical element 310 for each subregion or second imaging system 309 by referring to the database representing the correspondence relationship between the measured values and the optical element which is optimum for correcting the aberration.

Where the case is considered by way of example in which the optical element 1 or 2 is selected, as shown in FIG. 7B, with respect to each subregion in the same manner as in the second embodiment, the imaging should be performed in a state in which the corresponding optical element 1 or 2 is inserted into the second imaging system 309 that forms the image of each subregion. For this purpose, the control unit 203 inserts the optical element 1 or 2 into each of a plurality of second imaging systems 309 in accordance with the aforementioned selection (S508). In this case, the optical element 308 may be also inserted at the same time in the first imaging system 307 as necessary. For example, when the measured values are as a whole large in the positive direction, the optical element 308 having a negative correction amount corresponding to the representative value, such as an average value or minimum value, of all of the subregions is inserted into the first imaging system 307, and the optical element 310 is then used for fine correction of each region. As a result, the range of correctable aberration can be broadened in comparison with the case in which the optical element 308 is not used, and the probability of imaging being canceled in step S503 illustrated by FIG. 6 is reduced. Therefore, such as an approach is advantageous in terms of utility.

Figure 8C:
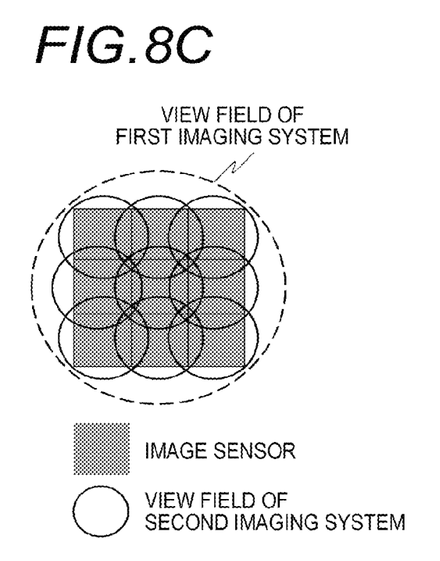

The imaging of the slide 303 is then performed by the imaging device 305, and the image data are transmitted to the image processing unit 401 (S509). Then, the control unit 203 determines whether or not the imaging has been performed with respect to all of the subregions (S510). Where there is a subregion that has not been subjected to imaging, the mutual arrangement of the view field of the second imaging system 309 and the slide 303 is changed, for example, by moving the imaging stage 302, and the imaging of the aforementioned subregion is performed upon replacing the optical element as necessary (S509). As shown in FIG. 8C, when the images of the adjacent subregions can be acquired simultaneously, for example, because of mutual overlapping of view field of a plurality of second imaging systems, it is also possible to perform only one cycle of imaging to pick up the image of the entire imaging region. In such a case, where for example nine divided subregions are assumed to be present, the imaging unit 300 can be constituted by the corresponding nine second imaging systems 309 and nine imaging devices 305.

Then, the image processing unit 401 generates synthesized image data from the acquired image data for all of the subregions (S511).

With the configuration of the above-described present embodiment, the aberration correction amount is changed for each subregion according to the thickness of the protective member relating to each subregion. Therefore, a high-quality image subjected to adequate aberration correction in the entire imaging region can be acquired even when, for example, the thickness of the protective member is not uniform. Furthermore, by using the optical element 308 in addition to the optical element 310, it is possible to expand the range of correctable aberration. Where the method of the present embodiment is compared with the method by which imaging of the entire imaging region is performed a plurality of times by changing the optical element 308 and then partial images optimum for each subregion are selected and synthesized, the method of the present embodiment is more advantageous in the following two aspects. Firstly, in the present embodiment, the acquired image data can be reduced to a minimum, without discarding part of the image data, thereby making it possible to reduce the cost of data storage and transfer. Secondly, in the present embodiment, the number of imaging cycles is determined by the ratio of subregions that can be subjected to imaging in one cycle, rather than by the number of optical elements that are used, and when the spread in aberration is large and optical elements of a large number of kinds are used, the processing efficiency can be comparatively high. Furthermore, when the ratio of subregions that can be subjected to imaging in one cycle is 100%, as in the case shown in FIG. 8C, one cycle of imaging will suffice. Therefore, the maximum possible processing efficiency can be realized.

The preferred embodiments of the present invention are described above. However, the present invention is not limited to those embodiments and various changes and modifications can be made without departing from the essence thereof. For example, in the above-described embodiments a transmission-type imaging unit that performs imaging of the light transmitted by the specimen is used, but the present invention can be also applied to an imaging apparatus using a reflection-type imaging unit that performs imaging of the light reflected by the specimen. Further, in the above-described embodiments, optical elements 304 of four kinds are used, but the number of the prepared optical elements and characteristics of each optical element can be set arbitrary corresponding to the range of the spread among the protective members. Further, in the second and third embodiments, the imaging region is divided into 3×3=9 subregions, but the number of the divided subregions and the size of each subregion can be set arbitrary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-138704, filed on Jun. 22, 2011 and Japanese Patent Application No. 2012-108654, filed on May 10, 2012, which are hereby incorporated by reference herein in their entirety.

What is claimed is:

1. An imaging apparatus that performs imaging of a specimen to acquire a digital image thereof, the imaging apparatus comprising:
    an imaging optical system that forms an image of the specimen;
    an imaging device that captures the image of the specimen through said imaging optical system;
    a measuring unit that measures, for each of a plurality of regions on the specimen, an optical aberration or a physical quantity causing the aberration before the imaging of the specimen is performed by said imaging device;
    a plurality of optical elements configured to correct the aberration with different correction amounts, said plurality of optical elements being configured such that each of said plurality of optical elements is insertable into and extractable from an optical path of said imaging optical system; and
    a control unit that selects an optical element from among said plurality of optical elements on the basis of a measurement result provided by said measuring unit, and inserts the selected optical element into the optical path before the imaging of the specimen is performed by said imaging device,
    wherein said plurality of optical elements are different from an optical element that is a component of said imaging optical system.

2. The imaging apparatus according to claim 1, wherein said control unit determines a correction amount for each of the plurality of regions in order to correct the aberration for each of the plurality of regions.

3. The imaging apparatus according to claim 2, wherein said control unit creates a table in which positions of the plurality of regions and the correction amounts are associated with each other.

4. The imaging apparatus according to claim 1, wherein
    a plurality of pieces of image data that differ in aberration correction amount are acquired by performing imaging of the specimen a plurality of times with said imaging device, while replacing the optical element inserted into said imaging optical system, and
    the imaging apparatus further comprises an image processing unit that synthesizes the plurality of pieces of image data so as to obtain a correction corresponding to the aberration or the physical quantity in each region on the basis of the measurement result obtained for each of the plurality of regions.

5. The imaging apparatus according to claim 1, wherein said imaging optical system has:
   a first imaging system that forms an intermediate image of the specimen; and
   a plurality of second imaging systems that are arranged corresponding to the plurality of regions and that form an image of the intermediate image on said imaging device, and
said control unit inserts the selected optical element into at least one optical path of said plurality of second imaging systems when the imaging of the specimen is performed by said imaging device.

6. The imaging apparatus according to claim 5, wherein said control unit inserts the selected optical element into an optical path of said first imaging system when the imaging of the specimen is performed by said imaging device.

7. The imaging apparatus according to claim 1, wherein said imaging optical system has a plurality of optical systems arranged corresponding to the plurality of regions, and
said control unit inserts the selected optical element into at least one optical path of said plurality of imaging systems when the imaging of the specimen is performed by said imaging device.

8. The imaging apparatus according to claim 1, wherein said control unit selects an optical element from among said plurality of optical elements on the basis of Zernike coefficients acquired by expanding the aberration measured by said measuring unit in Zernike polynomials.

9. The imaging apparatus according to claim 1, further comprising a storage unit that stores a table in which the physical quantities and the correction amounts are associated with each other.

10. The imaging apparatus according to claim 1, further comprising a rotating turret, wherein said plurality of optical elements are provided at said rotating turret.

11. The imaging apparatus according to claim 1, wherein the optical element is inserted into a position close to a pupil plane of said imaging optical system or a conjugate position thereof.

12. The imaging apparatus according to claim 1, wherein said imaging optical system is configured to be capable of forming simultaneously images of the plurality of regions on said imaging device.

13. An imaging apparatus that performs imaging of a specimen to acquire a digital image thereof, the imaging apparatus comprising:
   an imaging optical system that forms an image of the specimen;
   an imaging device that capture the image of the specimen through said imaging optical system;
   a measuring unit that measures, for each of a plurality of regions on the specimen, an optical aberration or a physical quantity causing the aberration before the imaging of the specimen is performed by said imaging device;
   a plurality of optical elements configured to correct the aberration with different correction amounts, each of said plurality of optical elements is arranged capable of being inserted into/extracted from an optical path of said imaging optical system; and
   a control unit that selects an optical element from among said plurality of optical elements on the basis of a measurement result provided by said measuring unit, and inserts the selected optical element into the optical path before the imaging of the specimen is performed by said imaging device,
   wherein said plurality of optical elements are different from an optical element that is a component of said imaging optical system, wherein a phase variation $\phi$ of the optical element is represented by the following equation:

$$\phi(r) = C \cdot (1 - \sqrt{1 - (NA \cdot r)^2})^2 \qquad (1)$$

where C is a constant determined from a wavelength of illumination light of said imaging unit and a refractive index and a thickness of a protective member that covers the specimen, NA is a numerical aperture of said imaging optical system on the specimen side, and r represents a radial component in polar coordinates on the optical element and is a value obtained by dividing a distance between a point through which an optical axis passes and an evaluation point by a radius of the pupil.

14. An imaging apparatus that performs imaging of a specimen to acquire a digital image thereof, the imaging apparatus comprising:
   an imaging optical system that forms an image of the specimen;
   an imaging device that capture the image of the specimen through said imaging optical system;
   a measuring unit that measures, for each of a plurality of regions on the specimen, an optical aberration or a physical quantity causing the aberration before the imaging of the specimen is performed by said imaging device;
   a plurality of optical elements configured to correct the aberration with different correction amounts, each of said plurality of optical elements is arranged capable of being inserted into/extracted from an optical path of said imaging optical system; and
   a control unit that selects an optical element from among said plurality of optical elements on the basis of a measurement result provided by said measuring unit, and inserts the selected optical element into the optical path before the imaging of the specimen is performed by said imaging device,
   wherein said plurality of optical elements are different from an optical element that is a component of said imaging optical system, wherein a phase variation $\phi$ of the optical element is represented by the following equation:

$$\phi(r) = C_1 r^2 + C_2 r^4 \qquad (2)$$

where C1 and C2 are constants determined from a wavelength of illumination light of said imaging unit and a refractive index and a thickness of a protective member that covers the specimen; and r represents a radial component in polar coordinates of the optical element and is a value obtained by dividing a distance between a point through which an optical axis passes and an evaluation point by a radius of the pupil.

* * * * *